United States Patent [19]
Wang

[11] Patent Number: 5,392,679
[45] Date of Patent: Feb. 28, 1995

[54] SAW EQUIPMENT

[76] Inventor: Mary Wang, No. 20, Alley 22, Lane 294, Sec. 3, Chang-Shui Road, Hsi-Hu Chen, Chang-Hua Hsien,

[21] Appl. No.: 101,898

[22] Filed: Aug. 3, 1993

[51] Int. Cl.6 ............................................. B27B 21/00
[52] U.S. Cl. ...................................... 83/766; 83/767; 83/698.11
[58] Field of Search ................. 83/764, 765, 766, 767, 83/471.3, 472, 477, 698, 581, 699.31, 698.11

[56] References Cited

U.S. PATENT DOCUMENTS

| | | | |
|---|---|---|---|
| 1,063,113 | 5/1913 | Bremer | 83/766 X |
| 1,075,730 | 10/1913 | Ross | 83/766 X |
| 1,096,072 | 5/1914 | Swanson | 83/766 X |
| 1,235,970 | 8/1917 | Guth | 83/766 X |
| 1,259,380 | 3/1918 | Eagleson | 83/766 |
| 1,447,417 | 3/1923 | Johnson | 83/766 |
| 1,653,386 | 12/1927 | Beyland | 83/766 |
| 1,910,383 | 5/1933 | Eitniear | 83/766 |

Primary Examiner—Rinaldi I. Rada

[57] ABSTRACT

A saw equipment includes a working table, a rotary arm unit, two adjustment members, a lock unit, a hacksaw, and a guide unit. The rotary arm unit has a rotary arm mounted pivotally on the working table, and two positioning plates respectively secured to two ends of the rotary arm. Each of the positioning plates has several angularly equidistant engaging slots formed therein. Each of the adjusting members includes a lock block and two parallel rods extending upward from the lock block. Each of the lock blocks has several angularly equidistant engaging tongues which engage a first set of the engaging slots of the corresponding positioning plate. The lock unit locks the adjusting members releasably on the rotary arm unit. The guide unit is vertically movable on the adjusting members so as to guide the saw blade to reciprocate on the adjusting members along a straight path. When the adjusting members are removed from the rotary arm unit, the engaging tongues can be engaged with a second set of the engaging slots so as to adjust the angle of the saw blade relative to a horizontal plane.

5 Claims, 6 Drawing Sheets

SAW EQUIPMENT

BACKGROUND OF THE INVENTION

1. Field of the Invention

This invention relates to a saw equipment, more particularly to a saw equipment which has two adjusting members for adjusting conveniently the angle of the saw blade of the saw equipment relative to a horizontal plane.

2. Description of the Related Art

Referring to FIG. 1, a conventional saw equipment 10 includes a working table unit 11, an adjusting unit 12 mounted pivotally on the working table unit 11, two connecting rod devices 14 disposed on two end portions of the adjusting unit 12, and a hacksaw 13 connected to the connecting rod devices 14.

The working table unit 11 has a middle plate 111, two scale plates 112 mounted respectively and securely on two opposite sides of the middle plate 111, and two support brackets 113 respectively secured to the bottom sides of the bottom ends of the scale plates 112. The adjusting unit 12, as shown in FIG. 2, includes a rotary arm 121, two retaining members 122 respectively secured to two ends of the rotary arm 121, and two generally U-shaped rotary saw supports 123 retained respectively and rotatably within the retaining members 122. The rotary arm 121 has a middle section mounted pivotally on the bottom side of the middle plate 111. A lock element 124 extends from a side wall of the middle section of the rotary arm 121 so as to lock the rotary arm 121 on the working table unit 11. An actuator plate 125 is mounted on the bottom side of the rotary arm 121 so as to facilitate the rotation of the rotary arm 121 when the rotary arm 121 is unlocked from the working table unit 11. Each of the retaining members 122 has several positioning holes 1221 formed therein and a curved surface 1222 formed in the outside wall of the retaining members 122 so as to mount the rotary saw support 123 thereon. Each of the rotary saw supports 123 has a hole 128 selectively aligned with one of the positioning holes 1221 of the corresponding one of the retaining members 122. A spring-loaded pin 126 extends through the hole 128 of the rotary saw support 123 to engage one of the positioning holes 1221 of the corresponding one of the retaining members 122 so as to position the rotary saw support 123 on the retaining member 122. Two bolts 127 engage two holes respectively, which holes are formed in the retaining member 122 on two sides of the curved surface 1222, in order to retain the rotary saw support 123 within the retaining member 122. Each of the rotary saw supports 123 further has a blind hole 1231 formed at an upper portion for positioning a respective one of the connection rod devices 14 therein such that the connecting rod devices 14 extend upwardly from the rotary saw supports 123.

When it is desired to adjust the angle of the saw blade of the hacksaw 13 relative to the top surface of the middle plate 111, the bolts 127 must be removed from a respective one of the retaining members 122, as shown in FIG. 3. At this time, the spring-loaded pins 126 are respectively pulled out of the positioning holes 1221 in the retaining members 122. In this way, the rotary saw supports 123 are capable of being rotated relative to the retaining member 122 to a selected angle, thereby locating the saw blade of the hacksaw 13 in an inclined position. Then, the spring-loaded pin 126 is released to engage another positioning hole 1221 of a respective one of the retaining members 122 so as to position the rotary saw support 123 at a predetermined location on the retaining member 122.

The above-mentioned adjusting process suffers from the following disadvantages: (1) Because the rotary saw supports 123 must be rotated simultaneously, it is difficult for the user to pull the spring-loaded pin 126 and to rotate the corresponding rotary saw support 123 with one hand. (2) When the hacksaw 13 is operated to saw wood, sawdust easily deposits on the curved surfaces 1222 of the retaining members 122, thus causing same difficulty in the rotation of the rotary saw supports 123.

SUMMARY OF THE INVENTION

The main object of this invention is to provide an saw equipment which has two adjusting members for adjusting conveniently the angle of the saw blade of the saw equipment relative to a horizontal plane.

According to this invention, a saw equipment includes a working table, a rotary arm unit, two adjusting members, a lock unit, a hacksaw, and a guide unit. The rotary arm unit includes a rotary arm with an intermediate portion mounted pivotally on the bottom surface of the intermediate portion of the working table and two upright positioning plates respectively secured to top surfaces of two end portions of the rotary arm. Each of the positioning plates has a generally V-shaped notch formed in the upper end portion thereof and a plurality of angularly equidistant engaging slots formed in the positioning plate and circumferentially aligned with each other. Each of the adjusting members has a lock block abutting against a respective one of the positioning plates. Each of the lock blocks has a plurality of angularly equidistant engaging tongues projecting therefrom to engage a first set of the engaging slots of the corresponding one of the positioning plates. The lock unit locks the adjusting members releasably on the rotary arm unit. The hacksaw includes a saw blade and a frame removably connected to two ends of the saw blade so as to facilitate the operation of the hacksaw. The guide unit is vertically removable on the adjusting members so as to guide the saw blade to reciprocate on the adjusting members along a straight path. Accordingly, when the adjusting members are removed from the rotary arm unit, the engaging tongues can be engaged with a second set of the engaging slots so as to adjust the angle of the saw blade relative to a horizontal plane.

BRIEF DESCRIPTION OF THE DRAWING

Other features and advantages of this invention will become apparent in the following detailed description of a preferred embodiment of this invention, with reference to the accompanying drawing, in which.

DETAILED DESCRIPTION OF THE PREFERRED EMBODIMENT

Figure 1:
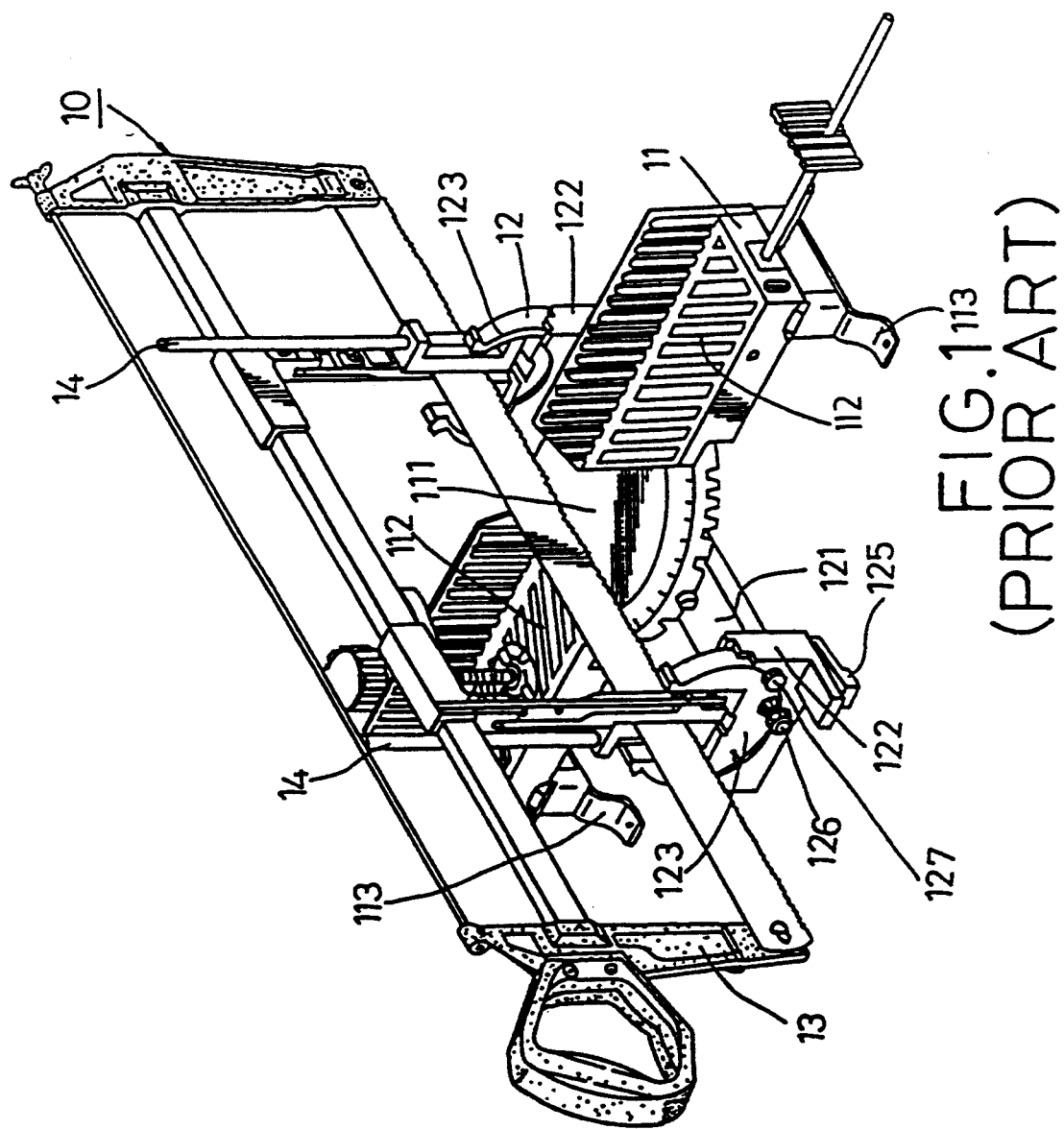
FIG. 1 is a perspective view of a conventional hacksaw assembly.
Figure 2:
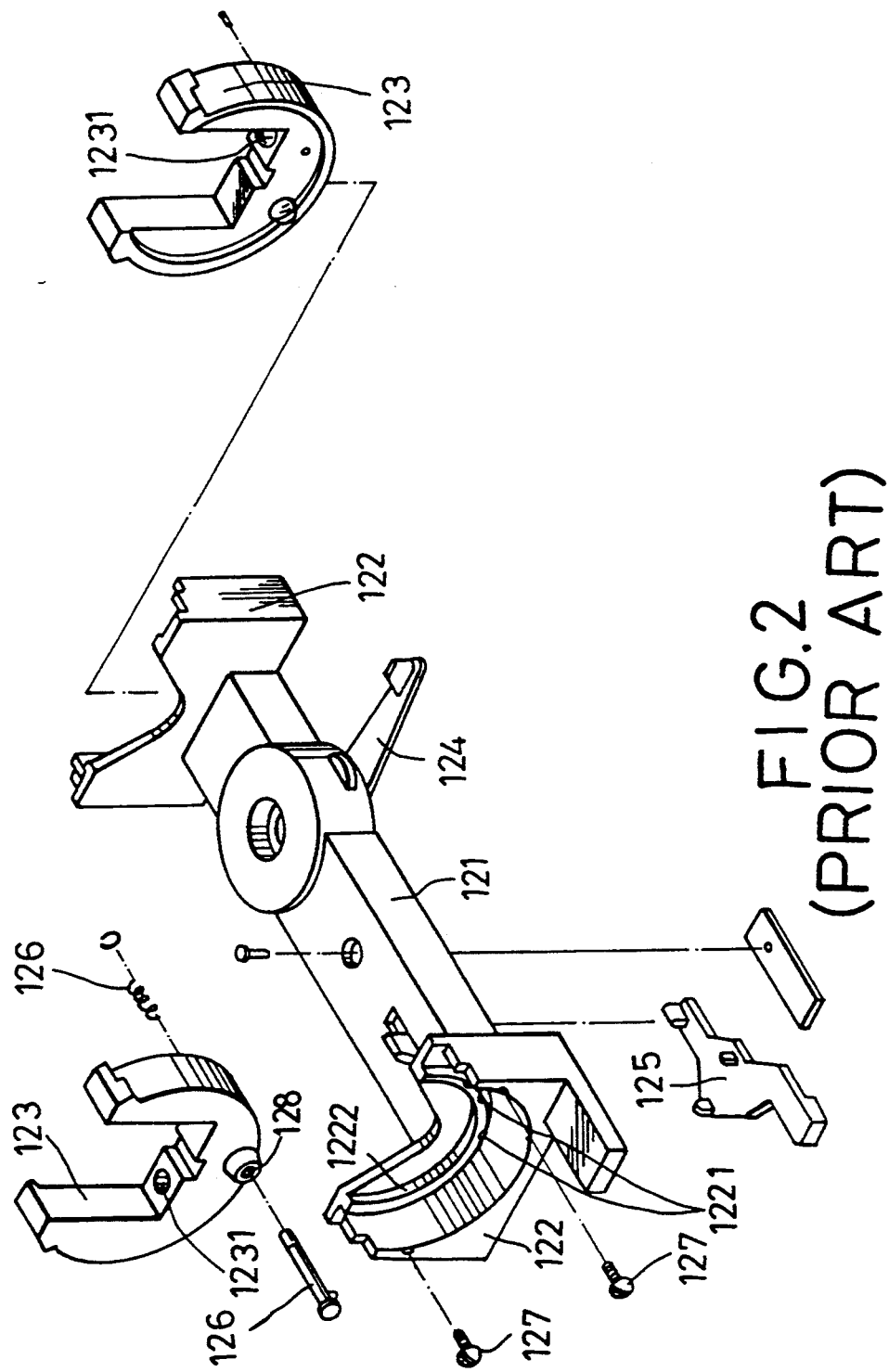
FIG. 2 is an exploded view of the adjusting unit of the conventional hacksaw assembly.
Figure 3:
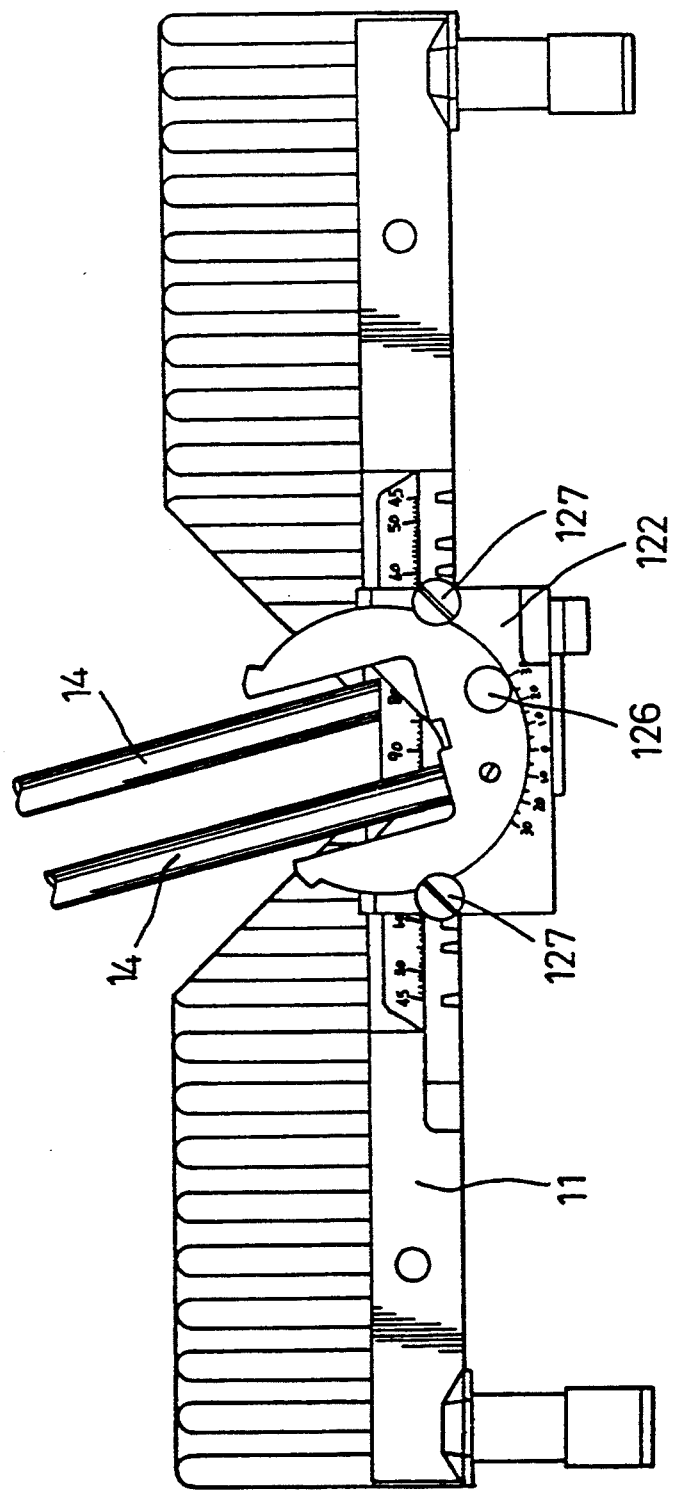
FIG. 3 is a schematic view illustrating the rotation of the adjusting unit of the conventional hacksaw assembly.
Figure 4:
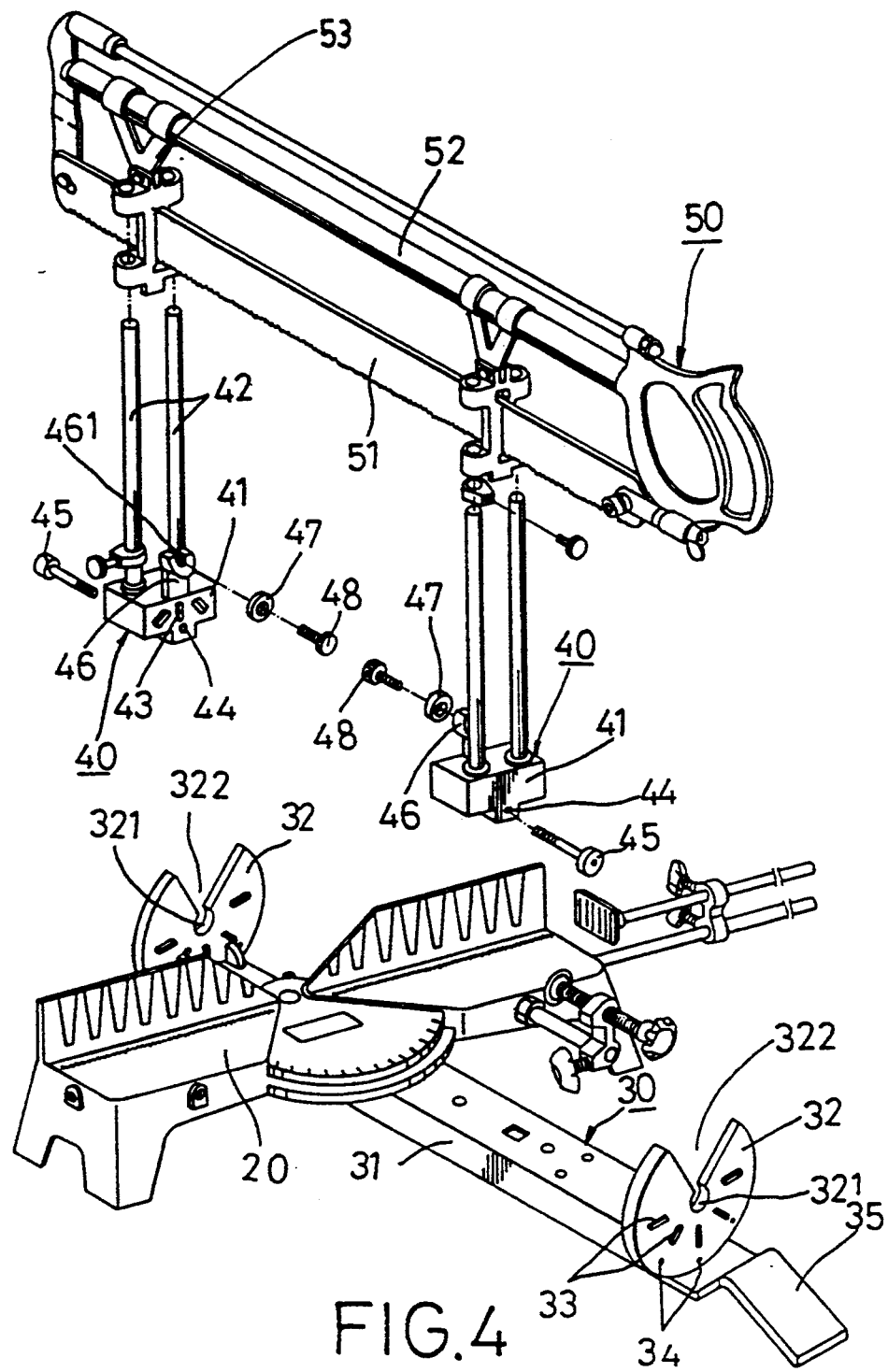
FIG. 4 is an exploded view of a saw equipment according to this invention.
Figure 5:
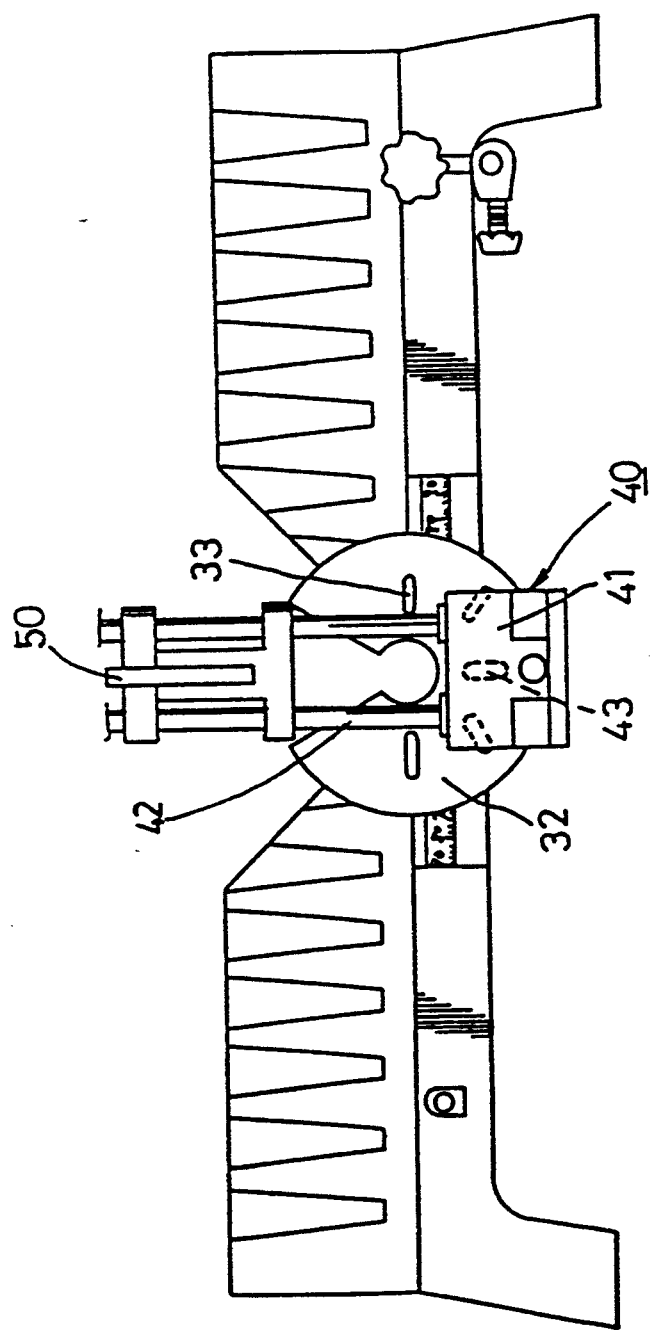
FIG. 5 is an elevational side view showing the saw equipment of this invention.

Referring to FIGS. 4 and 5, a saw equipment includes a working table 20, a rotary arm unit 30 mounted rotatably on the working table 20, two adjusting members 40, a lock unit locking the adjusting members 40 releasably on the rotary arm unit 30, and a hacksaw 50. The working table 20 and the hacksaw 50 are similar in construction to the working table 11 and the hacksaw 13 of the conventional saw equipment 10 (see FIG. 1).

The rotary arm unit 30 includes a rotary arm 31 with an intermediate portion connected pivotally to the bottom surface of the intermediate portion of the working table 20 in a known manner, and two upright positioning plates 32 respectively secured to the top surfaces of two end portions of the rotary arm 31. Each of the positioning plates 32 has a generally V-shaped notch 322 which is formed in the upper end portion of the positioning plate 32 so as to allow the hacksaw 50 to be operated therein. The bottom of each V-shaped notche 322 has a rounded tip portion 321. Five angularly equidistant engaging slots 33 are formed in the positioning plate 32 below the V-shaped notch 322 and are circumferentially aligned with each other so that any two adjacent engaging slots 33 are spaced apart from each other by an angle of 45°. Three threaded holes 34 are formed under the three lower engaging slots 33. An actuator plate 35 is connected securely to one of the end portions of the rotary arm 31 so as to facilitate the rotation of the rotary arm 31.

Each of the adjusting members 40 has a lock block 41 with an inside wall which abuts against the outside wall of one of the corresponding positioning plates 32, and two parallel rods 42 which extend upward from the top surface of the lock block 41. Three engaging tongues 43 project from the inside wall of the lock block 41 to engage selectively the three lower engaging slots 33 of the corresponding positioning plate 32 respectively. A lock element 46 is disposed in the top end of the inside wall of each lock block 41 and has a rounded edge portion and an internally central threaded portion 461. "The lock element 46 is mounted on and" aligned with the rounded tip portion 321 of the V-shaped notch 322 of the corresponding one of the positioning plates 32. "Two washers 47 with their outside diameters larger than the diameters of the two rounded tip portions 321 are abutted against the inside walls of the two positioning plates 32 respectively." Two bolt 48 are extended through the washers 47 and the rounded tip portions 321 of the two positioning plates 32 and secured to the internally threaded portions 461 of the two lock elements 46 respectively, thereby locking the lock block 41 on the corresponding one of the positioning plates 32. Each of the lock blocks 41 further has a hole 44 formed at a bottom portion, and is under the middle one of the engaging tongues 43. A bolt 45 extends through the hole 44 to engage with the corresponding one of the positioning plates 32 through one of the threaded holes 34, thereby locking the lock block 41 on the corresponding positioning plate 32 for adjusting the 52 at a desired angle. All of the threaded holes 34, the holes 44, the bolt 45, the lock elements 46, the washers 47 and the bolts 48 together constitute the lock unit.

The hacksaw 50 includes a saw blade 51, a frame 52 removably connected to two ends of the saw blade 51, and a guide unit with two guide elements 53. Each of the guide elements 53 is connected slidably to the frame 52 and has a generally H-shaped portion vertically movable on the parallel rods 42 of the corresponding adjusting member 40. The H-shaped portions of the guide elements 53 has slots confining the saw blade 51 therein so as to guide the saw blade 51 to reciprocate on the adjusting members 40 along a straight path.

Figure 6:
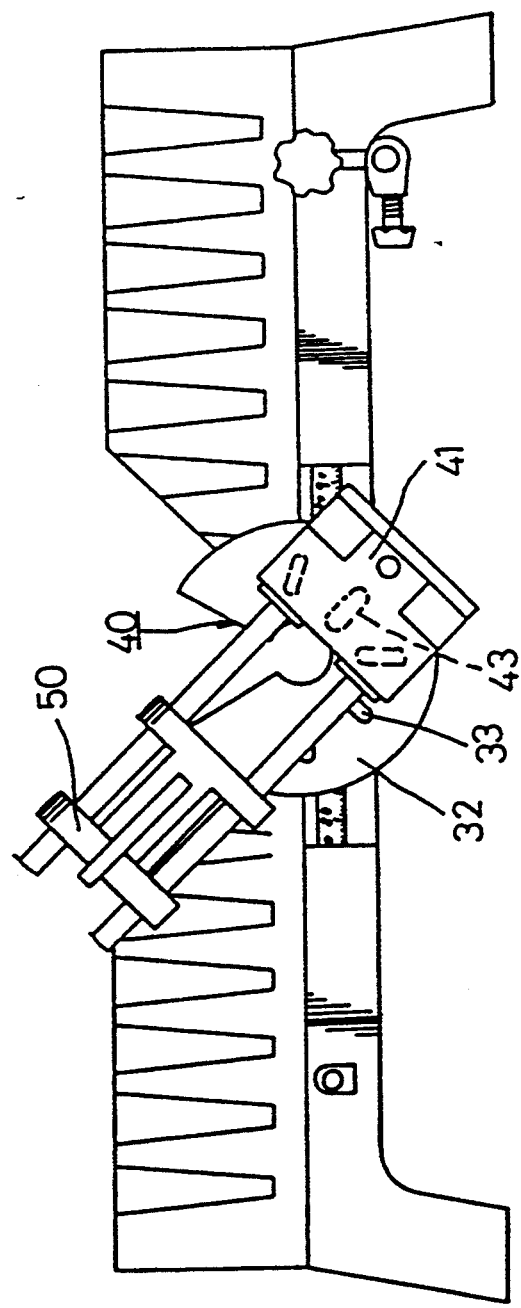
FIG. 6 is a schematic view illustrating the rotation of the adjusting members of the saw equipment in accordance with this invention.

When it is desired to adjust the angle of the saw blade 51, as shown in FIG. 6, the bolts 48 are respectively disengaged from the threaded portions 461 of the lock elements 46. At this time, the bolts 45 are respectively disengaged from the threaded holes 34 of the positioning plates 32. Then, the adjusting members 40 can be removed from the respective positioning plate 32 so that the user can adjust the location of the lock blocks 41 relative to the positioning plates 32, thereby adjusting the angle of the saw blade 51.

Referring again to FIG. 5, when the engaging tongues 43 of the lock blocks 41 are engaged within the lower three of the engaging slots 33 of the positioning plates 32, the hacksaw 50 and the rods 42 are located in a vertical position.

Referring to FIG. 6, when the engaging tongues 43 of the lock blocks 41 are engaged within the right three of the engaging slots 33 of the positioning plates 32, the adjusting members 40 are oblique on the positioning plates 32.

As a modified form of this invention, each of the positioning plates 32 can have seven angularly equidistant engaging slots formed therein and circumferentially aligned each other. Each adjacent two of the engaging slots are spaced apart from each other at an angle of 30°.

With this invention thus explained, it is apparent that numerous modifications and variations can be made without departing from the scope and spirit of this invention. It is therefore intended that this invention be limited only as indicated in the appended claims.

I claim:

1. A saw equipment, comprising:

a working table;

a rotary arm unit, mounted rotatably on the working table, comprising a rotary arm with an intermediate portion connected pivotally to a bottom surface of said intermediate portion of said working table, two upright positioning plates secured to top surfaces of two end portions of said rotary arm respectively, said two upright positioning plates each having a V-shaped notch formed in an upper portion thereof for allowing a hacksaw to be operated therein, the bottom of each notch has a rounded tip portion, and a plurality of angularly equidistant engaging slots formed in each of said positioning plate below said notch and circumferenfially aligned with each other;

two adjusting members, each of which has a lock block with an inside wall which abuts against an outside wall of a corresponding one of said positioning plates, each of said adjusting members further having a receiving means disposed on a top surface of said lock block for mounting said hacksaw therein and at least one engaging tongue projected from said inside wall of said lock block for engaging with one of said engaging slots of said corresponding positioning plate, said lock blocks each further having a lock element disposed on a top end of said inside wall thereof, said lock elements each having a rounded edge portion so as to mount on and aligned with said rounded tip portion of said V-shaped notch of the corresponding one of said positioning plates; and a lock means for adjustably firmly connecting said two lock blocks of said two adjusting elements to said two positioning plates of said rotary arm unit respectively so that said hacksaw can be adjusted to incline at a desired angle by rotating said two lock elements of said two lock blocks about said two rounded tip portions of said positioning plates respectively and locked in position by said lock means.

2. A saw equipment as recited in claim 1, wherein said positioning plates each comprises five engaging slots and said lock blocks each comprises three engaging tongues for engaging selectively with three of said engaging slots.

3. A saw equipment as recited in claim 1, wherein said two lock elements of said two lock blocks each further having an internally central threaded portion, said two adjusting members further comprising two washers and two bolts, said two washers having their outside diameters larger than the diameters of said two rounded tip portions being abutted against said inside walls of said two positioning plates respectively, said two bolts extending through said two washers and said rounded tip portions of said two positioning plates and screwed to said two internally threaded portions of said two lock elements respectively, whereby locking said lock blocks on said corresponding one of said positioning plates.

4. A saw equipment as recited in claim 1, wherein said lock means comprises third and fourth bolts, each of said positioning plates has three threaded holes formed under said engaging slots and each of said lock blocks further has a hole formed at a bottom portion, said third and forth bolts each extending through one of said holes to engage with a corresponding one of said positioning plates through one of said threaded holes.

5. A saw equipment as recited in claim 1, wherein said receiving means comprises two parallel rods which extend upward from a top surface of each of said lock block for mounting said hacksaw therebetween, and a guide unit vertically removable on each of said adjusting members so as to guide the saw blade of said hacksaw to reciprocate on said adjusting members along a straight path.

* * * * *